March 25, 1969  J. C. HELMER  3,435,334
METHOD AND APPARATUS FOR MEASURING HIGH VACUUMS
Filed April 4, 1966
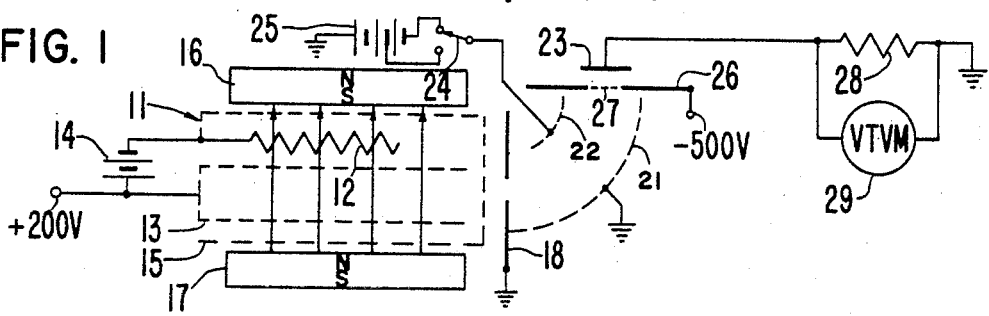
FIG. 1
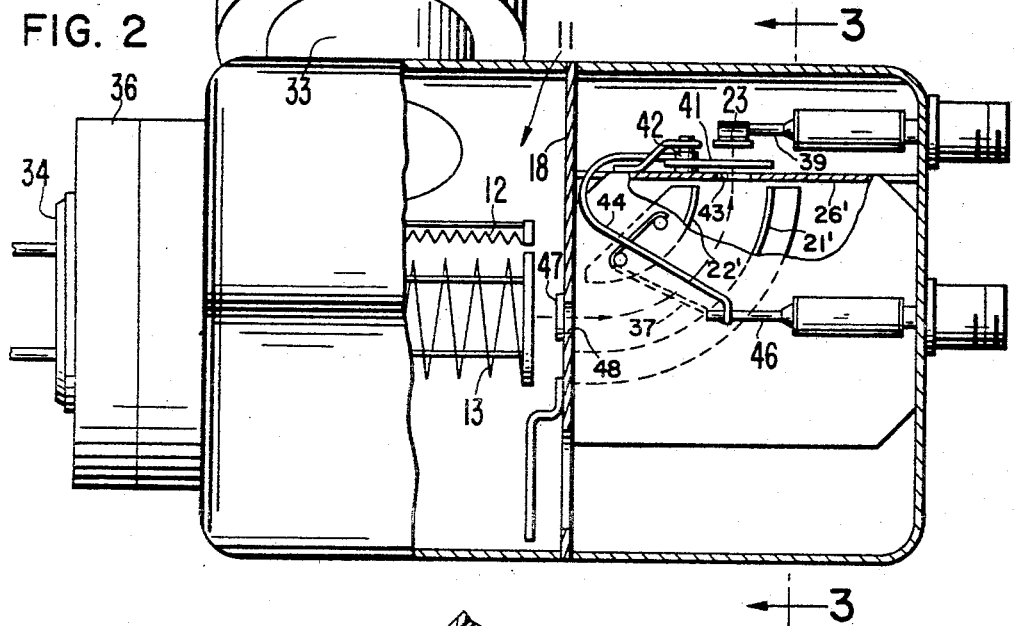
FIG. 2
FIG. 3
INVENTOR.
JOHN C. HELMER
BY
ATTORNEY

United States Patent Office 3,435,334
Patented Mar. 25, 1969

3,435,334
METHOD AND APPARATUS FOR MEASURING HIGH VACUUMS
John C. Helmer, Menlo Park, Calif., assignor to Varian Associates, Palo Alto, Calif., a corporation of California
Filed Apr. 4, 1966, Ser. No. 539,951
Int. Cl. G01n 27/62
U.S. Cl. 324—33   14 Claims

ABSTRACT OF THE DISCLOSURE

A reduction in the X-ray limit with a concomitant increase in ionization pressure gauge sensitivity to at least $10^{-14}$ torr is achieved by locating the ion collector out of line-of-sight of the source of X-rays, the ion beam source. The use of an ion source deriving ions of substantially equal energy followed by electrostatic deflection of the ions to the collector by means of a pair of mesh arcuate electrodes results in substantially equal paths for all deflected ions regardless of their respective charge-to-mass ratio and a reduction of X-ray reflection, respectively.

---

The present invention relates generally to ionization pressure gauges and more particularly to an ionization pressure gauge in which the ion beam is electrostatically deflected onto a collector to prevent the collector from receiving line of sight X-rays derived at the ion source.

In measuring pressure below $10^{-11}$ torr utilizing conventional techniques, such as the Bayard-Alpert ion gauge, the ion current is masked by photoelectric currents. The photoelectric currents are derived in response to X-rays, generated by electron bombardment of the anode structure. The X-rays produce a photoelectric current at the ion collector such that distinctions between photoelectric and ion currents are not possible. At pressures less than $10^{-11}$ torr, the photoelectric current at the electrode where the positively ionized gas molecules are collected exceeds the ion current. In consequence, completely erroneous results are derived by monitoring the collector current when measuring pressures less than $10^{-11}$ torr utilizing conventional structures and techniques.

In accordance with the present invention, the sensitivity of ionization pressure gauges is increased to at least $10^{-14}$ torr by positioning the collector electrode for the positively ionized gas molecules out of the line of sight of X-rays emerging from the ionization source. The positively ionized gas molecules are electrostatically deflected from the source onto the collector, thereby preventing the X-rays originating from the ionization source from reaching the collector, except via indirect reflective paths.

The use of an electrostatic deflector, in contrast to a magnetic deflector, enables substantially all ions of a given energy or voltage to be deflected along the same path, onto the collector, regardless of the mass charge ratio of the ions. This use of electrostatic deflection is in contrast to systems employing at least some magnetic deflection, for example, mass spectrometers, wherein deflection is utilized to separate ions having differing mass charge ratios. Of course, in a highly sensitive high vacuum pressure gauge it is essential that all of the ions, regardless of mass charge ratio, be directed onto the collector to obtain an accurate indication of the total number of molecules in the vacuum, and hence of the degree of vacuum.

A further feature of the present invention is that the ion source, deflector and collector, are all electrostatically isolated from each other. Isolation between the ionization source, deflector and collector, is accomplished through the use of electrostatic shielding slit plates at the ion source exit and immediately between the deflector and collector. By electrostatically isolating the deflector from the ion source and collector, electric field variations occurring at the deflector are not coupled to the collector or ion beam source and therefore do not affect the operation of the collector or source. Thereby, the ion and X-ray currents derived from the ion source remain constant despite the voltage on the deflector. Likewise, the residual photoelectric current at the collector is not affected by voltage on the deflector. Secondary electrons from the collector are further reduced by maintaining the slit plate located immediately in front of the collector at a suitable negative potential.

An additional feature of the present invention relates to the method in which it is operated. We have found that a very accurate indication of the background X-ray current coupled between the ion source and the collector can be obtained if the deflector has a voltage applied to it of sufficient magnitude to deflect the ion current and prevent it from reaching the collector. With the ion beam deflected so that it cannot reach the collector, a measurement is taken of the collector current due to X-ray emission from the ion source. This measurement is subtracted from the reading of collector current when the deflector voltage is maintained at its normal value, at which the ion beam is deflected on the collector. By subtracting the two currents, an accurate indication of the degree of vacuum in the environment being monitored is obtained and X-ray current effects are removed. In actual tests conducted, with the collector-slit plate at ground potential, it was found that the X-ray background current at the collector produced a reading corresponding to a pressure of $1.5 \times 10^{-13}$ torr. By subtracting the reading of $1.5 \times 10^{-13}$ torr from the pressure actually measured, pressure indications down to pressures as low as $1 \times 10^{-14}$ can be measured.

Deflecting the ion current away from the collector electrode has been found to be a much preferred method to prior art techniques which require modulation of potentials within the Bayard-Alpert gauge. This modulation inevitably produces some change in the electron current within the gauge, causing the measurement of the photoelectric or X-ray current at the collector to be uncertain.

A further feature of the present invention is that the electrostatic deflecting electrode is fabricated from a mesh or grid-like wire configuration. By forming the deflector from a grid or mesh-like configuration, the deflector appears essentially as a transparent body to the X-rays derived from the ionization source. The transparent nature of the deflector causes the X-rays to have a very high statistical probability of being passed through the deflector, rather than being reflected into the collector. The grid or mesh construction of the deflector causes the X-rays that do strike it to be reflected in many different directions, having a tendency to minimize even further the possibility of X-rays reaching the collector.

The ionization source with which the present invention is preferably employed comprises a filament for directing electrons toward a positively biased cylindrical grid. The filament is located outside the grid surface so electrons flow toward the grid axis. The grid allows electrons to pass through it into a central region where the electrons collide with the gas molecules to produce the ion beam that is directed through the exit slit plate of the ionization gauge.

It is a desirable, though not necessary, feature of the present invention that the ion beam current is increased by causing a greater number of electrons to be accelerated into the region inwardly located from the grid. Acceleration of the electrons to the region located inwardly of the grid is accomplished by establishing a magnetic field vector oriented along the electron beam path. It has been found that a relatively weak magnetic field, having a density on the order of 100 gauss, causes sufficient electron current to occur within the field to raise the sensitivity of the gauge of the present invention by a factor of five. The relatively weak field does not affect deflection of the ion current so that all the ions of a given energy or voltage traverse the same path in reaching the collector, regardless of their mass to charge ratio.

It is, accordingly, an object of the present invention to provide a new and improved high vacuum ionization pressure gauge.

Another object of the present invention is to provide a high vacuum ionization pressure gauge in which the effects of X-rays derived at the ionization source are minimized in the current derived from the collector.

It is an additional object of the present invention to provide a new and improved ionization vacuum pressure gauge employing an electrostatic deflector, wherein electric field variations occurring at the deflector are not coupled to the collector or ionization source.

It is still another object of the present invention to provide an ionization vacuum pressure gauge having an electrostatic deflector that is adapted to have differing potentials applied thereto, wherein said differing potentials do not affect the ion current derived from the ionization source or the photo-electric current derived from the collector.

It is a further object of the present invention to provide a method for operating an ionization vacuum pressure gauge having an electrostatic deflector wherein the background X-ray current derived from the ionization source can be measured without changing the number of ions produced for a given pressure.

Yet an additional object of the present invention is to provide an ionization vacuum pressure gauge having approximately the same sensitivity as prior art pressure gauges but without the inaccuracies introduced thereby in response to X-ray currents generated by the ionization source.

Still yet an additional object of the present invention is to provide a new and improved ionization vacuum pressure gauge wherein the collector is positioned out of the line of sight of the ionization source and which gauge has a sensitivity on the same order of magnitude as prior art devices, i.e., between 0.02 and 0.1 ampere per torr.

The above and still further objects, features and advantages of the present invention will become apparent upon consideration of the following detailed description of one specific embodiment thereof, especially when taken in conjunction with the accompanying drawings, wherein:

FIG. 1 is a schematic diagram of a preferred embodiment of the present invention;

FIG. 2 is a detailed, front sectional view of a preferred embodiment of the present invention; and FIG. 3 is an end sectional view of the structure illustrated in FIG. 2, taken along the lines 3—3.

Reference is now made to the figures, wherein ion source 11 comprises a filamentary source 12 of electrons. Electron source or cathode 12, which has the usual ribbon or elongated shape, is mounted externally of cylindrical grid cage 13 which accelerates electrons from the cathode by virtue of the positive potential applied to it by D.C. source 14, which in a typical embodiment has a potential of 100 volts. Cathode 12 and accelerating grid cage 13 are surrounded by cylindrical shield 15 which is maintained at the same potential as the cathode by virtue of its connection thereto. Since grid cage 13 is maintained at a potential above ground, typically +200 volts, shield 15 is employed to isolate cathode 12 and grid 13 electrostatically from the walls of the ion gauge.

Cathode 12 is floated relative to the walls of the vacuum pressure gauge, rather than being connected directly to ground, because the floating connection enables the potential of grid 13 to be varied without changing the potential between the grid and cathode. In many instances, it is desired to change the voltage on cage 13 to vary the fractional energy resolution of the ion beam derived from source 11. The fractional energy resolution of the ion beam derived from source 11 is defined as the potential at which the ion beam is maintained as it leaves the source divided by the voltage or energy spread of the ions leaving the source, i.e., the difference in potential of the various ions leaving the source (typically approximately 5 volts). Since the voltage spread is approximately constant regardless of the beam voltage, it is seen that the fractional energy resolution is increased by raising the potential of cage 13. Of course, increasing the fractional energy resolution of the ion beam leaving source 11 enables the ion beam to be focussed to a smaller cross sectional area, to increase the detected current and sensitivity of the ion gauge.

As an auxiliary, though not necessary, feature of the present invention, the ion current can be increased by a factor of five by establishing a relatively weak D.C. magnetic field, having a value of approximately 100 gauss, along the electron path between filament 12 and grid 13. The D.C. magnetic field can be established by any conventional means, such as bar magnets 16 and 17 that are located within source 11, or with electromagnets.

In operation, electrons are emitted from cathode 12 and are attracted to the adjacent surface of grid cage 13. The electrons travel radially from cathode 12 to grid 13 and many pass through the grid to the interior of grid 13, due to their kinetic energy. Thereby, an electron stream is established within the interior of grid 13 along planes at generally right angles to the grid surface. Bar magnets 16 and 17 reduce the interception of electrons attracted to grid 13 from cathode 12 and thereby increase the electron density within the interior of the grid cage.

Electrons within the interior of grid cage 13 collide with gas molecules from the vacuum environment being monitored. In response to electrons striking the gas molecules, positive ions are formed, in a manner well known to those skilled in the art. The positive ions, which have a potential equal to the voltage at which cage 13 is maintained, are extracted from ion source 11 through the source metallic exit slit plate 18. Exit slit plate 18 is maintained at ground potential, whereby it serves as an electrostatic shield and any voltage variations downstream of ion source 11 are not coupled into the ion source. Thereby, the electron and ion currents in source 11 remain relatively constant despite potential variations external of the source.

Downstream of ion source 11 spaced, insulated arcuate deflecting plates 21 and 22 are positioned. Deflecting plates 21 and 22 are provided to direct ions emerging from source 11 onto collector electrode 23, that is out of the line of sight of charged particles emerging from the source. By positioning collector 23 out of the line of sight of charged particles emerging from source 11, positive ions derived from the source can be directed to the collector while negative charged particles, X-ray or photo-electron currents, are directed away from the collector.

In a preferred embodiment, deflector plates 21 and 22 are constructed of a grid having a mesh on the order of 50. By utilizing a grid for deflector plates 21 and 22, X-rays derived from source 11 generally propagate through the deflector region and are not directed toward collector 23. Those X-rays that do strike the grid wires of deflector plates 21 and 22 cause electrons to be derived that are reflected in a random manner. Randomness of the electrons evolved from deflection plates 21 and 22 occurs because of the multiplicity of angles at which the electrons may strike the circular grid wire surface.

Arcuate deflection plates 21 and 22 deflect the ion beam from source 11 through an angle of approximately 90°. Each of deflection plates 21 and 22, in a preferred embodiment, subtends an arc of 90°, with outer plate 21 having a radius of 1.25 inches, while the inner deflection plate has a radius of approximately ¾ of an inch.

To control deflection of the ion beam emerging from source 11 onto collector 23, outer deflection plate 21 is preferably grounded. Inner deflection plate 22 is selectively connected to a D.C. potential of —20 volts or —250 volts through two position switch 24 and negative D.C. source 25, the positive terminal of which is grounded. Under normal operating conditions, when it is desired to monitor the vacuum of the environment being measured, switch 24 and D.C. source 25 apply a —250 volt potential to inner deflecting plate 22. The —250 volt potential on inner plate 22 causes the positively charged ion beam emerging from source 11 to be deflected in an arcuate path onto collector 23. The negative potential of deflecting plate or grid 22 accelerates the positively charged ions towards collector 23 from the straight line path in which they emerge from slit plate 18.

When it is desired to determine the current impinging on collector 23 as a result of X-ray or photocurrents emerging from source 11, the ion beam derived from the source is deflected by plates 21 and 22 to a position wherein virtually no ions reach the collector. Deflection of the ion beam so that it does not reach collector 23 is accomplished by adjusting switch 24 so that a potential of —20 volts is applied to inner deflection plate 22. The —20 volt potential on deflection plate 22 causes the ion beam to be collected on the outer deflection plate 21 and prevents the arcuate travel thereof to collector 23. The relatively small negative potential applied to inner deflection plate 22 suppresses the secondary electrons generated on plate 21 by ion impact. Any ions reflected from plate 22 are reattracted to the plate and are prevented from reaching the collector.

It is to be understood that virtually the same type of operation can be performed by connecting a ground potential to inner deflection plate 22 and switching outer deflection plate 21 to potentials of +85 volts and +500 volts. In response to positive potentials being applied to outer deflection plate 21, the positively charged ions are repelled from the plate to cut off the flow of ion current between source 11 and collector 23. It has been found in practice, however, that the use of a negative potential on inner deflection plate 22 is preferable to the employment of a positive potential on outer deflection plate 21. The negative potential on inner plate 22, by causing the ions to be accelerated, rather than repelled, reduces the divergence of the ion beam as it strikes collector 23. By reducing the divergence of the ion beam emerging from deflector plates 21 and 22, greater currents are derived from collector 23 and the sensitivity of the ion gauge is increased. The use of electrostatic deflection plates 21 and 22, rather than magnetic deflection for the ion beam, enables virtually all ions emerging from source 11, regardless of the mass charge ratio of the ions, to be directed onto collector plate 23.

In one embodiment as shown in FIG. 1, positioned downstream of deflection plates 21 and 22 and before collector 23 is a further slit plate 26, that is maintained at a potential of —500 volts. Slit plate 26 includes a mesh grid 27 in its aperture for enabling ions deflected by plates 21 and 22 to reach collector 23. Slit plate 26, in addition to electrostatically isolating the potential variations of deflector plates 21 and 22 from collector 23, further suppresses coupling of negatively charged electrons, derived from X-ray currents, onto collector 23 and prevents secondary electrons from being evolved from the collector due to ion bombardment.

To monitor the ion current striking collector 23, hence provide an indication of the vacuum of the system being monitored, the collector is connected to ground through resistor 28. Resistor 28 is shunted with a high impedance D.C. meter, such as a vacuum tube voltmeter 29, whereby the reading of the meter is indicative of the collector 23 current.

To describe the manner in which the present invention functions, positively charged ions and X-rays leave source 11 in a straight line. As the charged particles leave source 11, their line of flight is not directed toward any segment of collector electrode 23. Most of the X-rays pass through the apertures of the grid-like surface of deflection plate 21. Approximately 10% of the X-ray current strikes and is reflected from a deflection plate 21 in random directions. Only a small proportion of the reflected X-rays reach the collector 23 to produce a residual photoelectric current. Thereby, the photoelectric current due to the X-ray contribution of the ion source 11 is minimized. A large proportion of any photoelectric current which is created may be further suppressed by the applied negative voltage to split plate 26 which prevents photoelectrons from leaving the collector 23. The use of this additional suppression becomes significantly important when it is desired to accurately measure pressures below $10^{-13}$ torr. Alternatively, the subtraction technique described below may be used.

With the inner deflection plate 22 maintained at a potential —250 volts, the ion beam derived from source 11 is deflected onto collector 23. The collector current is measured by reading the value of vacuum tube voltmeter 29. The potential of inner deflection plate 22 is then changed to —20 volts by moving switch 24, whereby the ion beam from source 11 is deflected so it cannot reach collector 23. The collector current is now read from vacuum tube voltmeter 29 to provide an indication of the background X-ray current. The above operations are repeated a number of times. The average collector current with the ion beam deflected so that it strikes collector 23 is subtracted from the average collector current when the ion beam is deflected away from collector 23. The resultant of the subtraction operation is utilized to indicate the actual pressure of the vacuum environment being measured. The subtraction operation provides an accurate indication of the vacuum because the X-ray current at collector 23 is not affected by deflecting the ion beam away from the collector. By utilizing the technique described and the gauge of the present invention, it is possible to measure accurately pressures as low as $10^{-14}$ torr.

FIGS. 2 and 3 illustrate front end sectional views of another embodiment of the apparatus actually employed as the gauge of the present invention. Gas molecules from the vacuum environment being monitored are introduced into ion source 11 via port 31 that includes flange 32 to be secured, by bolts, to a port on the vessel in which the vacuum is maintained. The molecules flow through the aperture in flange 32, traverse neck 33 of port 31 and flow into ion source 11.

The ion source 11 includes cathode 12 and grid cage 13. Electrical connections to cathode 12 and grid cage 13 are established by leads from electrical connector 34 that pass through flange plate 36. Electrical potential to solid arcuate deflection plates 21' and 22' is established by connecting outer plate 21' directly to slit plate 18, maintained at ground potential, while the negative of a source is coupled to inner deflection plate 22' by means of a conductive strap 37 and connector 38 mounted on the side wall of the deflector, as indicated by FIG. 3. The current in collector 23 is monitored by connecting the collector with connector 39, mounted on the side wall of the gauge housing. Of course, each of the connectors 34, 38 and 39 maintains vacuum integrity within the confines of the gauge housing, which preferably is fabricated of metal or glass. Electrostatic shielding also is provided between the deflection plates and collector by split plate 26' which in this embodiment as distinguished from that shown in FIG. 1 is fixedly and conductively mounted to slit plate 18. Hence, slit plate 26' is maintained at ground potential.

To suppress secondary electron current flow from collector 23, a mesh grid 41 is mounted insulatingly apart from slit plate 26' by insulating space 42 to be in covering relation with aperture 43 defined by slit plate 26. Grid 41 is maintained at a negative potential, preferably in the range of —100 to —300 volts, by coupling grid 41 via conductive strap 44 and connector 46 to a suitable negative potential source. Although the placement of grid 41 is different from the placement of grid 27 in FIG. 1, it serves the same purpose. However, with the embodiment of FIG. 1, the electrostatic field in the aperture of the slit plate 26 is more uniform.

To enhance the electrostatic isolation between ion source 11 and deflectors 21' and 22', a mesh grid 47 is mounted to cover the aperture 48 defined by slit plate 18 and maintained at the potential of slit plate 18.

While I have described and illustrated specific embodiments of my invention, it will be clear that variations of the details of construction which are specifically illustrated and described may be made without departing from the true spirit and scope of the invention as defined in the appended claims.

What is claimed is:

1. In an ionization vacuum gauge for measuring the degree of pressure of a volume of gas, wherein the effects of X-ray photo-electric currents on the measurement are minimized, the improvement comprising: ionization means responsive to the gas for deriving positively charged ions, said ionization means also deriving X-rays and having an opening through which can pass said ions and said X-rays, a collector for said positively charged ions positioned downstream from said opening, and a pair of spaced, insulated arcuate electrostatic deflection plates subtending an angle of greater than 45° including means for blocking the direct bombardment of said ion collector by said X-rays positioned in line of sight between said opening and said collector for simultaneously directing substantially all of said ions onto said collector, while preventing direct X-rays from reaching said collector.

2. The ionization gauge of claim 1 further including electrostatic shielding means between said deflection plates and each of said ionization source and said collector.

3. The gauge of claim 2 further including means for maintaining the electrostatic shield means between said deflection plates and said collector at a negative potential relative to the collector, said negative potential being sufficiently great to suppress the flow of electrons between said deflection plates and said collector.

4. The vacuum gauge of claim 1 wherein at least one of said arcuate plates comprises a grid having sufficient spacing to enable X-ray currents to flow through it.

5. The vacuum gauge of claim 1 further including a source of D.C. voltage having at least two potentials relative to a predetermined, constant potential, means for applying selectively one of said at least two potentials to one of said deflection plates, means for applying said predetermined, constant potential to the other of said deflection plates, one of said at least two potentials, when applied to said one plate, being of such value as to deflect said ions away from said collector, the other of said at least two values of said potential, when applied to said one plate, being of such value as to cause the ions to be deflected on to said collector.

6. The gauge of claim 5 wherein said at least two potentials are negative relative to said predetermined potential, said deflection plates having differing radii of curvature, said predetermined constant potential being applied to the deflection plate having greater radius and said two potential values being selectively applied to the deflection plate having the smaller radius.

7. The ionization gauge of claim 1 wherein said ionization means comprises a source of electrons, a grid spaced from said electron source for attracting electrons from said source, said grid having openings along the path of said electrons to permit the passage therethrough of substantial numbers of said electrons, wherein said gas is ionized by said electrons between the walls of said grid, said grid having an open end from and through which an ion beam is extracted.

8. The ionization vacuum gauge of claim 7 further including an electrostatic shield surrounding said electron source and said grid, and means for maintaining said shield at substantially the same potential as said electron source.

9. The vacuum gauge of claim 7 further including means for establishing a magnetic field directed along the electron flow path between said electron source and said grid.

10. The ionization vacuum gauge of claim 7 further including a D.C. potential source, means for connecting said D.C. potential source between said grid and said electron source so that the potential of said electron source may be varied relative to ground while remaining fixed relative to said grid.

11. The ionization vacuum gauge of claim 1 further including means connected to said collector for measuring the collector current.

12. A method of measuring the degree of vacuum of a gas, comprising the steps of forming a beam of ions of said gas in an ionization region while forming X-rays in the neighborhood of said ionization region, deflecting the positively ionized particles along a curved path subtending an angle of greater than 45° onto a collector located out of the line of sight of said region where said particles become ionized, determining the current from said collector when said ionized particles are deflected thereon, deflecting said positively ionized particles away from said collector, determining the current derived from said collector when said ionized particles are deflected away from it and subtracting the second of said predetermined currents from the first of said predetermined currents.

13. In a method of measuring the contribution of X-ray currents to the determination of vacuum in an ion gauge, wherein arcuate electrostatic deflection means are provided for normally directing ions onto a collector, the improvement comprising the steps of forming a beam of ions and directing said beam along an arcuate path between said arcuate electrostatic deflection means, selectively applying a voltage to said deflecting means to deflect said ions so that they are prevented from reaching said collector, and measuring the collector current when said voltage is applied to said deflection means.

14. In a vacuum ionization gauge for measuring the degree of pressure of a volume of gas, the improvement comprising: ionization means responsive to the gas for deriving positively charged ions, said ionization means also deriving X-rays, a collector spaced apart from said ionization means for collecting said positively charged ions, and arcuate electrostatic deflection means including switch means and X-ray blocking means positioned between a region where the charged ions emerge from said ionization means and said collector, said switch means being adapted to apply potentials to said electrostatic deflection means for selectively directing in a first mode substantially all of said ions onto said collector and directing in a second mode substantially none of said ions to impinge on said collector while said blocking means is adapted to prevent X-rays from reaching said collector, except by reflection.

References Cited

UNITED STATES PATENTS

| 2,538,267 | 1/1951 | Pierce et al. | 313—63 X |
| 2,774,008 | 12/1956 | Rooks | 313—63 X |
| 2,957,985 | 10/1960 | Brubaker | 313—63 X |
| 3,292,078 | 12/1966 | Herzog | 324—33 |

RUDOLPH V. ROLINEC, *Primary Examiner.*

C. F. ROBERTS, *Assistant Examiner.*

U.S. Cl. X.R.

313—7, 63